United States Patent
Ruppert

[19]

[11] Patent Number: 5,988,696
[45] Date of Patent: Nov. 23, 1999

[54] CONNECTOR FOR TUBES

[76] Inventor: Hans-Peter Ruppert, Gottfried-Kinkel-Str. 5, 65187 Wiesbaden, Germany

[21] Appl. No.: 08/699,658

[22] Filed: Aug. 19, 1996

[30] Foreign Application Priority Data

Aug. 19, 1995 [DE] Germany ........................ 295 13 306 U
Dec. 1, 1995 [DE] Germany ........................ 295 19 060 U
Jul. 6, 1996 [DE] Germany ........................... 296 11 845

[51] Int. Cl.⁶ .................................................. F16L 47/00
[52] U.S. Cl. ................................... 285/123.1; 285/125.1; 285/328; 285/368; 285/423; 285/906
[58] Field of Search ............................... 285/423, 123.1, 285/123.15, 371, 148.19, 1, 124.5, 123.14, 332, 363, 368, 93, 125.1, 328, 906; 137/798, 833

[56] References Cited

U.S. PATENT DOCUMENTS

| | | | |
|---|---|---|---|
| 1,160,703 | 11/1915 | Fleming | 285/123.15 |
| 1,349,663 | 8/1920 | Cumfer | 285/123.15 |
| 1,497,652 | 6/1924 | Browne | 285/123.15 |
| 1,521,482 | 12/1924 | Steele | 285/123.15 |
| 1,774,664 | 9/1930 | Parmley | 285/423 X |
| 3,884,511 | 5/1975 | Hermanson | 285/93 |
| 4,336,959 | 6/1982 | Roche | 285/368 |
| 4,570,701 | 2/1986 | Roberts | 285/368 X |
| 4,732,414 | 3/1988 | Inabe | 285/123.15 |
| 4,783,303 | 11/1988 | Imgram | 264/535 |
| 5,088,774 | 2/1992 | Spiegelman | 285/123.15 |
| 5,092,632 | 3/1992 | Washizu et al. | 285/371 X |
| 5,261,704 | 11/1993 | Araujo et al. | 285/423 |
| 5,437,482 | 8/1995 | Curtis | 285/368 |

FOREIGN PATENT DOCUMENTS

| | | | |
|---|---|---|---|
| 2043273 | 3/1972 | Germany | 285/FOR 157 |
| 2910529 | 9/1980 | Germany | 285/423 |

*Primary Examiner*—Dave W. Arola

[57] ABSTRACT

A connector for connecting tubes or the like includes at least one main body with a connecting surface arranged thereon for the connection or flange-mounting of tubes wherein the at least one main body includes or consists of a cross-linked plastic material.

29 Claims, 4 Drawing Sheets

CONNECTOR FOR TUBES

FIELD OF THE INVENTION

The invention concerns a connector for connecting tubes and pipes, and preferably cross-linked plastic tubes and pipes.

The connector according to this invention can also be used for connection of hoses, measurement sensors of measurement apparatuses as well as similar items of equipment such as fittings and the like, and the term tube or pipe will thus be used herein to also embrace such articles.

BACKGROUND OF THE INVENTION

Various connecting devices are known for connecting tubes and pipes, which are suitably adapted to their respective purpose of use.

For example metal tube connectors were used in the pneumatics art in relation to tubes and pipes of for example a diameter of 32 or 50 mm. Those connectors which were generally cast are either in-line connectors or T-shaped connectors in order to connect together either two or three tubes. Metal connectors of that kind however suffer from serious disadvantages. When dealing with the above-indicated tube diameters, that already involves a very high weight for the metal connector and that weight, with even larger tube diameters, increases not in a linear relationship but approximately with the third power of the tube diameter. Furthermore the metals used are generally unstable in relation to acids and are frequently not permitted for foodstuffs. Although special alloys such as for example chromium-nickel steels admittedly have a higher level of chemical stability, they are however difficult to process and extremely expensive.

As plastic tubing is increasingly being used across an ever widening range of uses, the use of metals is here too rather undesirable. Because of differences in thermal expansion characteristics, stresses occur in the metal-plastic transition and the properties of the metal result in an undesirable decline in the otherwise high level of attraction of plastic tubing.

Hitherto different component.,s were used for respective different purposes of use in the sectors of pneumatics, domestic installations, sewage and fresh water systems and the chemical industry.

SUMMARY OF THE INVENTION

An object of the present invention is to provide a universal connector which is of high chemical stability or acid-resistant.

Another object of the invention is to provide a connector for tubes or the like which is low in weight and is simple to produce and which can be employed in a versatile manner.

The foregoing and other objects are attained in accordance with the principles of the invention by a versatile connecting device including at least one block-like main body which entirely or for a large part consists of a cross-linked plastic material or at least includes a cross-linked plastic material. The main body has at least one connecting surface for the connection or flange-mounting of a tube or tubes.

It was hitherto assumed that plastic materials are not suitable for heavily loaded connecting devices by virtue of having a temperature-creep diagram which was inferior to metals. It has been found however that it was possible to refute that prejudice by the use of cross-linked plastic materials, for example cross-linked polyethylene or cross-linked polyacetal. The use of polyethylene with preferred degrees of cross-linking of at least 60% meant that it was possible to provide connecting devices which durably withstand high compression loadings (exerted by fluids, trickling materials and blown materials) and which nonetheless were extremely light in comparison with metals.

Further plastic materials which are available for such a connecting device with equally good properties include in particular phenolic resin or are plastic materials based on unsaturated polyester resins.

Optionally those plastic materials can be reinforced with additives for further enhancing their mechanical properties such as strength and impact resistance, in which respect in particular glass and plastic fiber materials present themselves as reinforcing substances. For example reference may be made as a fiber-reinforced plastic material of this kind from the group of 'glass fiber-reinforced unsaturated polyester resins (GF-UP)' to in particular SMC 0300 which in a fire situation neither melts nor drips and which is suitable for uses which require enhanced surface quality as well as a lower tendency to deformation and shrinkage.

By virtue of adopting a block-shaped main body which has outside surfaces that are oriented substantially perpendicularly to each other or at an angle to each other, it is possible to use inexpensive block material which can be easily processed or machined as by drilling, sawing, cutting, grinding or milling. The machining operation can be effected prior to or after cross-linking.

Those machining options are still retained even after the connector is finished and cross-linked. Bores or holes with or without a screwthread can be produced in the connector on site by means of hand-held tools in order to permit the connection of further feed or discharge means.

With a simple cubic plastic block as the main body it is already possible to provide a T-connector by virtue of the incorporation of a through bore and a further bore which opens laterally into the through bore.

The use of the connector according to the invention is in no way limited to tubes or pipes of equal diameter. It is possible to produce transitional portions and connections which serve as an intermediate portion for the most widely varying connecting systems. By using through bores of a tapering configuration or bores which open into each other, of different diameters, it is possible to produce adaptor portions for any different diameters and even for different flange systems.

The block connector according to the invention of cross-linked plastic material can be used from a simple spacer portion up to a complicated multiple connector with additional connections which are subsequently provided on Bite.

In order to facilitate machining it is also possible to effect shaping machining of initially non-cross-linked plastic blocks, such as for example by drilling, milling, sawing, cutting, grinding and the like, and thereafter to cross-link the blocks for example by irradiation.

Alternatively block connectors of that kind can be shaped by injection molding, with the possibility of subsequent irradiation cross-linking or with chemical cross-linking which already occurs in the injection molding procedure.

An anchor element may be inserted into the plastic material for carrying the stressing and tensile forces of the contact pressure screws of a flange connection. Through bolts have the following functions:

a) distributing the tensile forces of the flange connection, and b) stabilizing the plastic connector in relation to distortion.

The anchor elements can advantageously be in the form of screwthreaded bolts or pins, tie bars, transverse pins or also studs, and they preferably each have fixing means which are accessible from the exterior, in the form of female or male screwthreads.

For the purposes of exact positioning of the tie bars or studs they can be secured within the main body by transversely extending bolts or pins.

The sealing action of the connector in relation to the connected pipe or tube is still further considerably increased by respective concentric grooves arranged in the connecting flange.

By virtue of the versatile machineability of the block item or the flexible choice of shape in the injection molding procedure the connecting surface of the block connector does not in any way have to be flat but may also include conical or tapering portions, for example for connecting a conical or tapering connector.

In addition virtually any desired connecting angle as between two tubes or pipes can be embodied by suitably selecting the angle of respective connecting surfaces relative to each other.

Because of the properties involved, affording elasticity in respect of shape and stability in respect of shape, there is no need for the interposition of further sealing means or seals in order to provide a connection affording fluid-tight sealing integrity. This extremely considerable advantage, for example having regard to the different coefficients of expansion or chemical properties involved, makes it possible to use the connector both for a wide temperature range and also for versatile and different purposes of use. Besides sanitary, domestic, vehicle and aircraft installations, such purposes of use occur in the sectors of the chemical and foodstuffs industry, pneumatics and generally in the field of fluid transport.

Particularly in the above-mentioned field of fluid transport, it is advantageous to provide in the main body an additional separate through passage, at a spacing relative to the through bore, in order in a simple manner to provide an integral connector for a tube-in-tube system which affords two mutually separate systems if for example a medium-carrying inner tube is to be disposed for safety reasons within an outer tube.

Depending on the respective tube and flange type, both the inner tube and the outer tube are fixed directly to the connector which is suitably machined to shape. Alternatively however the integral connector can also be used in relation to a multi-part connector.

Advantageously depending on the respective area of use the adaptor portion and/or the main body are of such a configuration as to provide a multi-part connector in which the connecting flange of the inner tube is arranged between the adaptor portion and the main connector body in such a way that a fluid-tight connection is guaranteed between the inner tube and the connector solely by fixing of the outer tube without an additional fixing means for the inner tube, while the provision of through passages in the adaptor portion ensures that the outer tube system is not interrupted.

By suitable shaping machining of the adaptor portion, for example by producing a groove therein, the adaptor portion can be provided with additional seals or sealing means as may be respectively required for hermetically sealing off the outer tube system relative to the environment.

Furthermore, for monitoring the entire tube system, a pressure-sensitive sensor can be fitted into any main body which is integrated into the tube system, through a bore which extends into a through passage, so that a possible rise or drop in pressure within the outer tube system as a result of a leak in the inner tube or outer tube system is immediately detected.

Further objects, features and advantages of the invention will be apparent from the following description of preferred embodiments.

DESCRIPTION OF THE PREFERRED EMBODIMENTS

Figure 1:
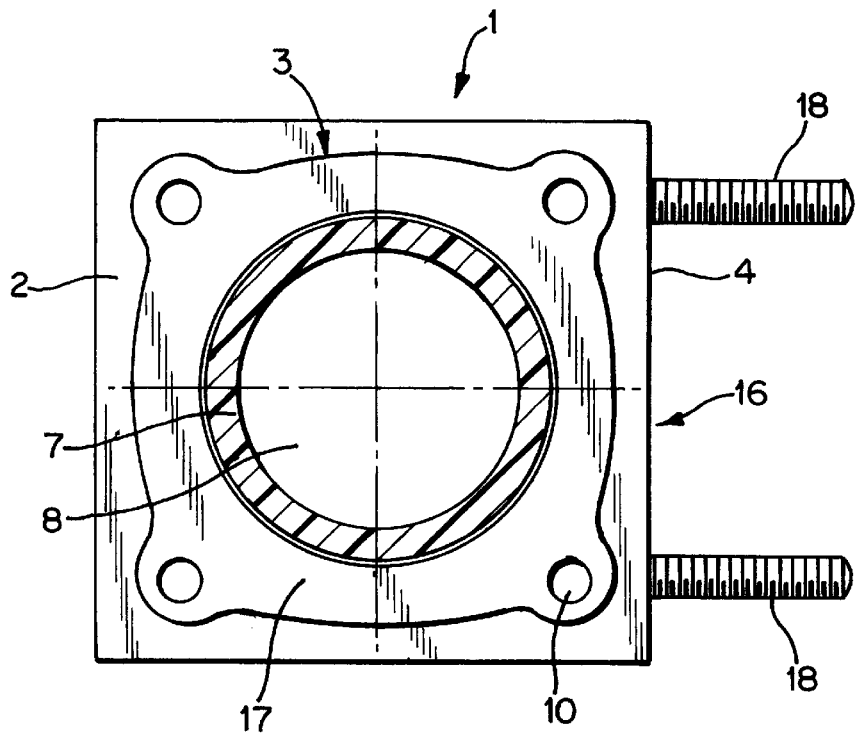
FIG. 1 is a side view of a first embodiment of the connector according to the invention, viewing from the direction of a tube or pipe connected thereto.
Figure 2:
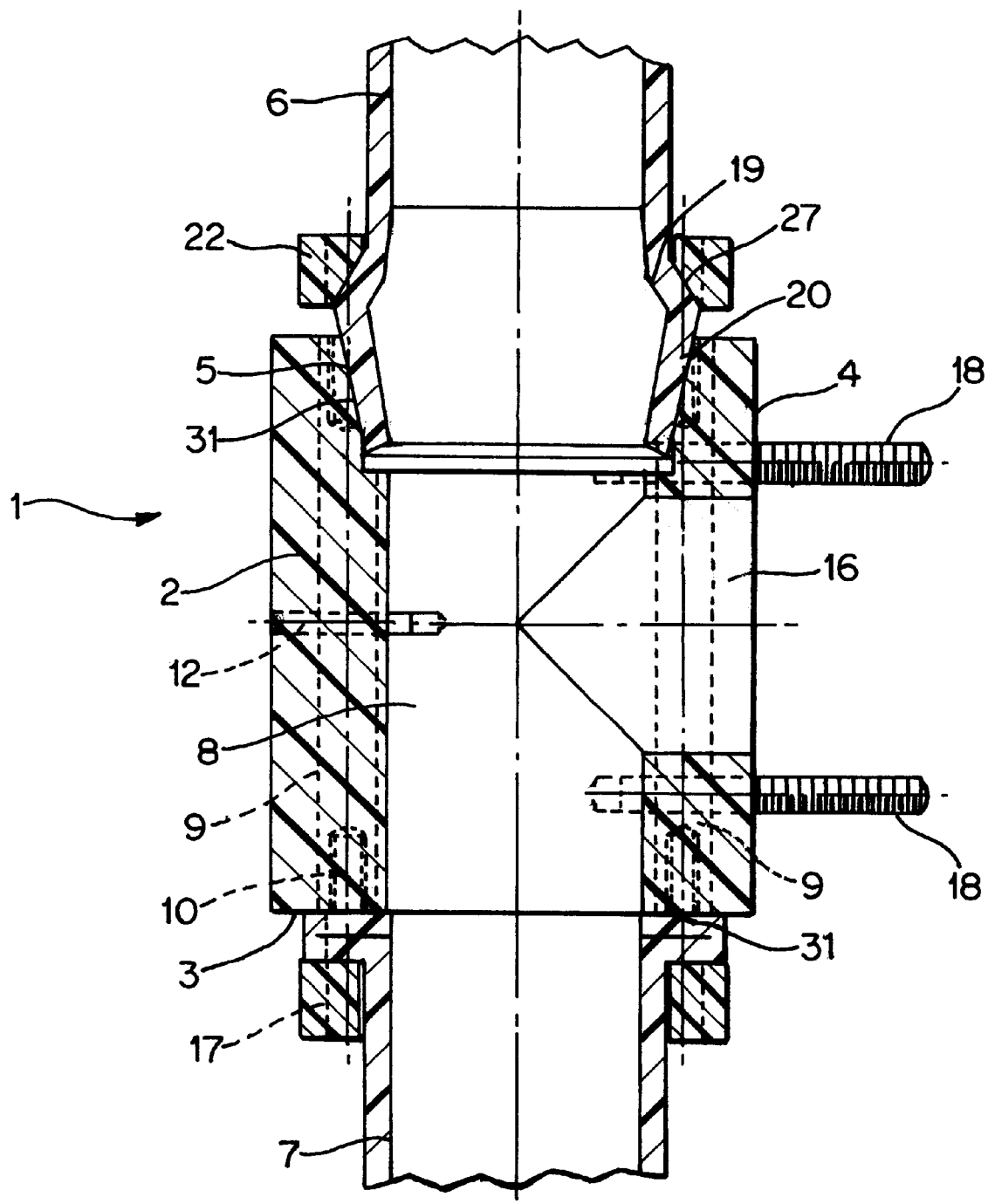
FIG. 2 is a cross-sectional view of the first embodiment of the connector according to the invention in the plane of the longitudinal axis of its through bore.

Hereinafter the connector which is generally identified by reference numeral 1 will be described with reference to the first embodiment according to the invention as is shown in FIGS. 1 and 2.

The connector 1 comprises a block-shaped main body 2 comprising cross-linked plastic material. The cross-linked plastic material can include or consist of cross-linked polyethylene (PE), cross-linked polyacetal, cross-linked phenolic resin or also SMC 0300. In addition, instead of the above-indicated plastic materials, it is possible to use any other kind of plastic material (including fiber-reinforced plastic materials) or mixtures of kinds of plastic materials with similar strength properties.

The main body 2 comprises block material, that is to say solid material, which is produced with substantially flat side walls. That block material is put into its shape which is described in detail hereinafter by shaping-machining procedures such as for example drilling, milling, sawing, cutting, grinding or the like.

Alternatively the main body 2 is put into its definitive shape by injection molding. That may involve subsequent irradiation cross-linking or chemical cross-linking may be initiated by means of chemical additives in the plastic material. Preferred degrees of cross-linking are in this case at least 60%.

Extending through the main body 2 is a through bore 8 which respectively opens at outer connecting flanges 3 and 5 for connecting tubes or pipes 6, 7 or for flange-mounting thereof. An can be seen from FIG. 2, opening into the through bore 8 perpendicularly thereto is a through bore 16 which extends from a further connecting surface 4, thus completing the fluid-guidance configuration for a T-shaped connector 1.

Without limitation in terms of generality, only some of a plurality of flanging options are illustrated on the connector 1 in the embodiment shown in FIGS. 1 and 2.

The tube or pipe 7 is pressed for example by means of a flange ring 17 which engages from behind over a laterally enlarged flange region thereof, with a connecting face 31 against the connecting surface 3 of the main body 2, without the interposition of any souls or sealing means. In that arrangement the flange ring 17 embraces the tube or pipe 7 with only a small amount of lateral clearance in order always reliably to exclude elastic changes in shape of the tube or pipe 7, which may occur at high pressures. The laterally enlarged flange region of the tube or pipe 7 is preferably produced by a procedure such as that shown in German laid-open application (DE-OS) No 44 23 372.3 or EP 95 110 340.7.

The connecting surfaces 3 and 4 are provided with grooves which extend concentrically relative to the through bores 8 and 16 respectively and which, when tube or pipe portions are connected thereto, press sealingly into the connecting face 31 of the respective tube or pipe, for example the tube or pipe 7. That further promotes a fluid-tight fit.

The flange ring 17 is held to the main body 2 by screws (not shown) which are screwed into female screwthreads of tie bars 9. The tie bars 9 are secured to prevent them from slipping axially in the main body 2 by pins 12 which extend transversely with respect to the tie bars 9 and which pass through them preferably at 90°. In this arrangement the pins 12 are preferably pressed in positively locking engagement into blind bores in the main body 2.

Alternatively flange rings 17 can be held by means of screwthreaded pins or bolts 18 and suitable nuts, for example to the connecting surface 4.

It is moreover in accordance with the invention to use studs with male screwthreads, or other suitable anchor elements, instead of the tie bars 9. As shown in FIG. 2 on the right-hand side thereof, a stud 9 of that kind can carry stresses in the main body 2 when a further loose flange is tightened.

Opposite the connecting surface 3 and at the other end of the through bore 8 the tube or pipe 6 is fluid-tightly held to the main body 2 by means of an internal cone 19. In that arrangement the connecting surface 5 has a conical surface portion 20 which bears against the outside of the tube or pipe 6 which is curved inclinedly outwardly by the internal cone 19. A flange ring 22 bears with a conical inside surface 21 against the rearward, also conical and upwardly tapering flank of the tube or pipe 6 in forcelocking engagement therewith. The internal cone 19, the conical connecting surface portion 20 and the flange ring 22 with its conical inside surface 21 provide a connector which essentially makes use of the principle of the connector described in German Utility Model application No G 89 11 166.4, the disclosure thereof also being incorporated into this specification in its entirety.

Figure 3:
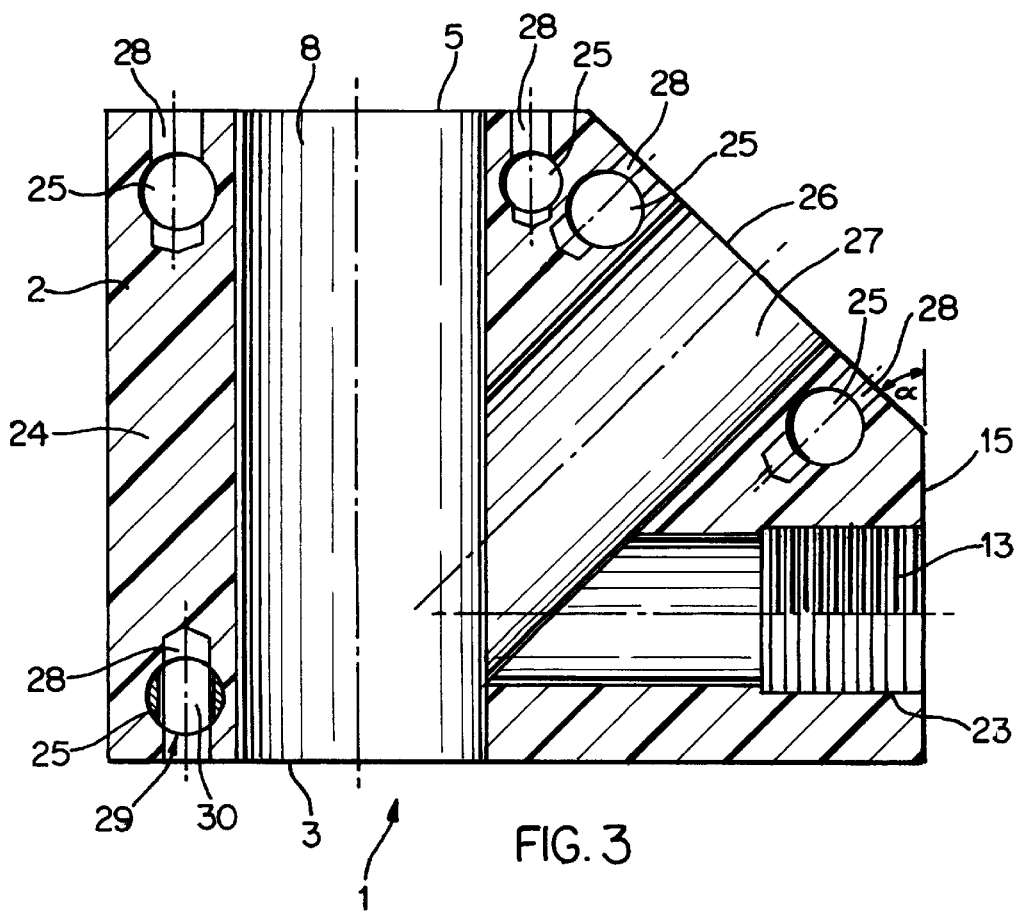
FIG. 3 is a cross-sectional view through a second embodiment of the connector according to the invention approximately in the plane of the center lines of its through bores.

Further fixing options are shown on the block connector 1 of the second embodiment according to the invention which is shown in cross-section in FIG. 3.

When dealing with low pressures and small diameters for example a simple female screwthread 23 may already serve for connection to a connecting surface 15 of a tube or pipe provided with a male screwthread or a corresponding tube adaptor portion.

Furthermore it is possible for further through bores for the connection of feed or discharge means to be provided for example in the region 24 of the wall of the main body 2 or in other wall regions, even after assembly or during assembly on site.

A further alternative form of fixing for the anchor elements 9 is shown in the left-hand region of the connector 1 above the connecting surface 3.

Extending parallel to the connecting surfaces 3, 5, 26 are blind or through bores 25 disposed beside the fluid-carrying through bores 8, 27, substantially perpendicularly to said through bores. Extending from the connecting surface 3, 5, 26 in a normal direction a&e blind bores 28 which are associated with and which pass preferably centrally and perpendicularly through the respective bores 25. A cylindrical pin 29 which is shown by way of example only in the bottom left corner of the connector 1 is arranged in each of the bores 28 in such a way that a through bore 30 therein which has a female screwthread extends in coaxial relationship with the bore 28 and the pin 29 thus forms within the main body 2 an anchor element 9 for screws or studs.

It is also in accordance with the invention for the respective above-described fixing systems to be used in any combination, in dependence on use-related predetermined diameters and pressures.

It is further in accordance with the invention for the connector 1 to be provided with one or more further bores 27 angled in any manner, for the angular connection of additional tubes or pipes. In that case then at least one connecting surface 26 is inclined relative to at least one further connecting surface, at an angle which is not a multiple of 90°.

By virtue of the mechanical design configuration involved and the choice of material for the main body 2 the connector 1 according to the invention is suitable both for pneumatic, aerodynamic and hydrodynamic uses and also chemical or foodstuffs industry uses in which tube-in-tube systems are frequently employed for example for considerations relating to safety.

For that purpose, it is recommended that the connector 1 according to the invention is in the form of a multi-part connector 1, as will be described hereinafter with reference to FIGS. 4 and 5. It should be mentioned here that for the sake of simplicity no fixing means are shown in FIGS. 4 and 5, but in that respect all the foregoing description relating to FIGS. 1 through 3 unreservedly applies.

Figure 4:
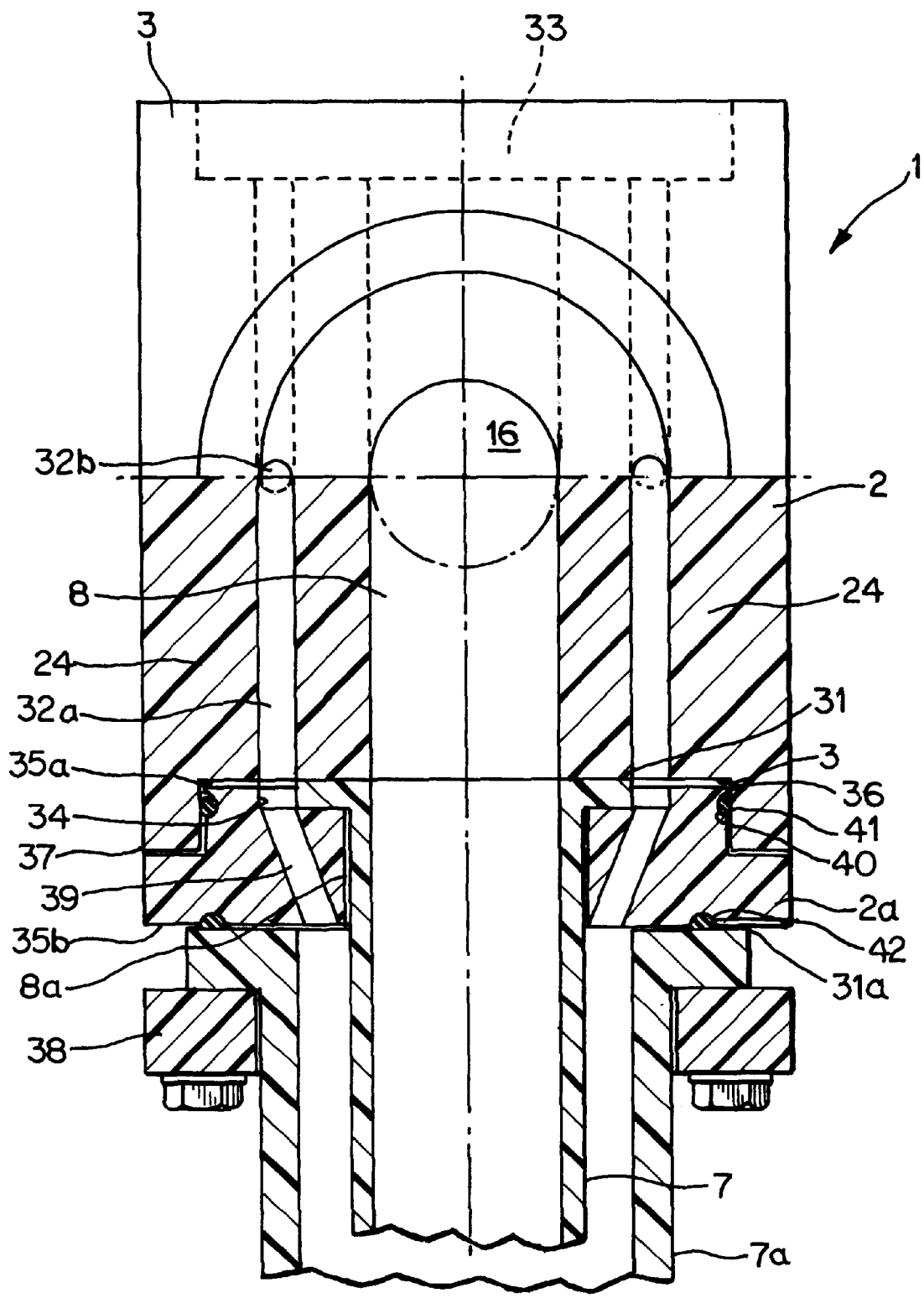
FIG. 4 is a diagrammatic cross-sectional view through a first embodiment of a multi-part connector according to the invention for the connection of a tube-in-tube system.
Figure 5:
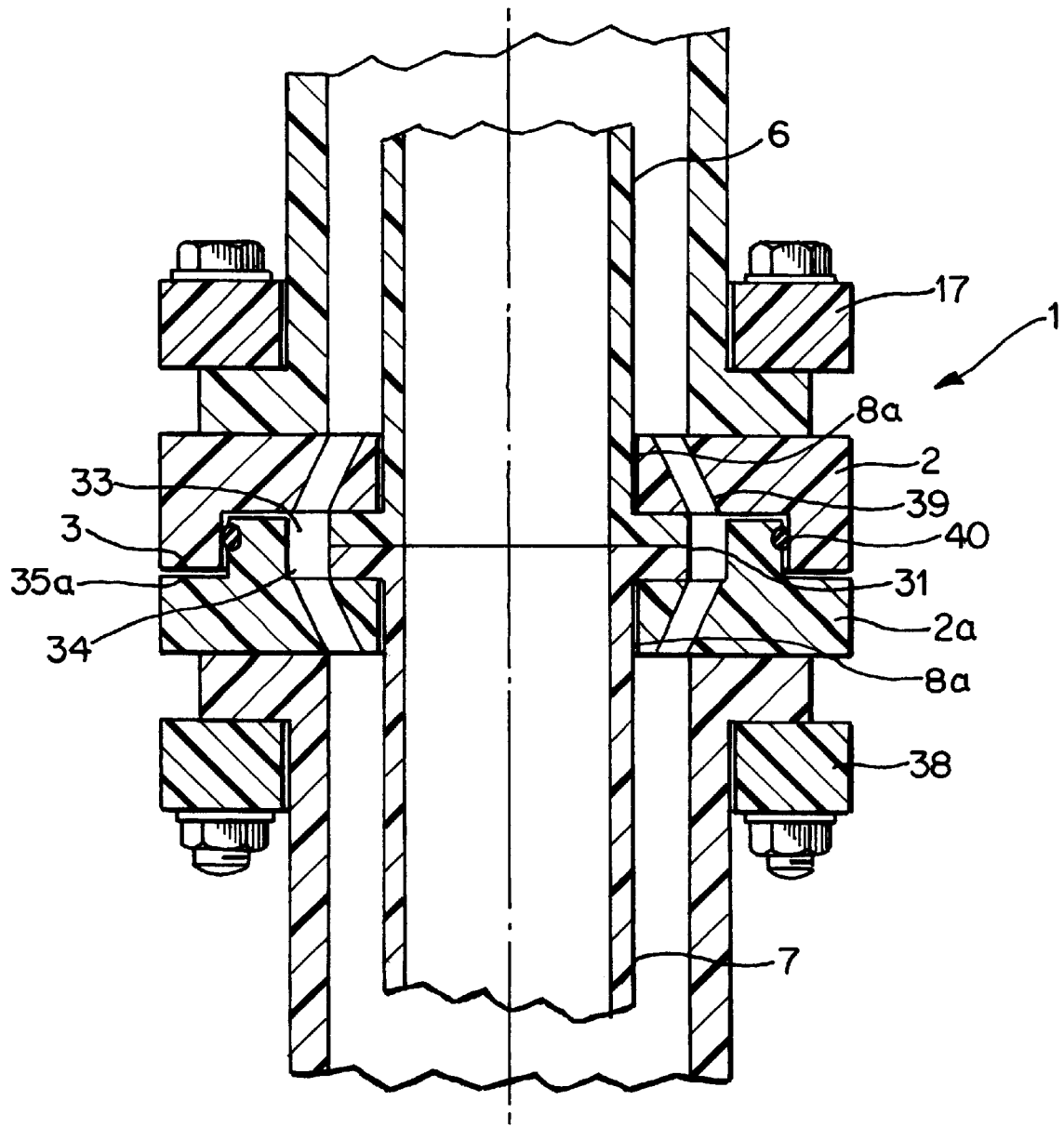
FIG. 5 is a cross-sectional view through a second embodiment of the multi-part connector according to the invention for the straight-line connection of tubes in the example of a tube-in-tube system.

As shown in FIG. 4 the multi-part connector 1 includes the individually machinable block-shaped main body 2 and at least one further block-shaped main body 2a which can also be individually machined. Similarly to the T-connector in FIG. 2, the main body 2 has a through bore 8 and a through bore 16 which opens perpendicularly into same. In addition, shown in the wall region 24 are four through passages 32a, 32b, wherein preferably two through passages 32a extend between the connecting surfaces 3 and a respective through passage 32a which starts from the third connecting side opens perpendicularly into each of the through passages 32a. As already described, in the region of the connecting surface 31 of the tube or pipe 7 the connecting surface 3 has concentrically extending grooves and is provided with a cylindrical recess 33 in order to be able to receive a cylindrical projection 36 with the co-operating connecting surface 35a, which is machined to shape, of the main-body 2a. The cylindrical projection 36 is defined at its end by the sealing surface 35a and laterally by the outside periphery thereof, with the groove 40.

The main body 2a is provided with a through bore 8a in order to embrace the tube or pipe 7 with only slight lateral clearance so that the main body 2a performs the function of the flange ring 17, in relation to the tube or pipe 7.

For that purpose the connecting surface 35a of the main body 2a has a circular recess 34 in order to be able to engage from the rear over the enlarged lateral flange region of the tube or pipe 7, the depth of the recess 34 being such that the flange thickness projects therein. At the outside periphery of the sealing surface 35 the main body 2a has the groove 40 in which is arranged a sealing ring or O-ring 41.

Upon assembly of the tube-in-tube connection the tube or pipe 7 can firstly be so arranged in the main body 2a that the flange thereof is received by the recess 34. The cylindrical projection 36 can then be arranged in the recess 33. In that way a fluid-tight connection of the outer tube system is already provided by means of the O-ring 41 in the groove 40. Irrespective of the axial position of the main bodies 2, 2a relative to each other, the O-ring 41 seals in the groove 40 and permits the pressure with which the flange of the tube or pipe 7 is pressed against the main body 2 to be freely selected. Then an outer tube or pipe 7a is pressed from the rear by means of a flange ring 38 against the connecting surface 35b of the main body 2a, the tube 2a being of larger diameter than the tube 7 and receiving same in its interior.

In addition, provided in the main body 2a are two through passages 39 which communicate at the connecting surface 35a with the through passages 32a of the main body 2 and which open between the tube or pipe 7 and the tube 7a into the connecting surface 35b so that this provides a second outer fluid-tight tube system.

The connecting surfaces 35a and 35b may also be provided with concentrically extending grooves for providing for fluid-tight sealing integrity. Alternatively or in addition, in the selected embodiment, a further O-ring 42 may be arranged in a groove provided in an annular configuration in the connecting surface of the outer tube. The use of sealing means is also not absolutely necessary as the milling of grooves in the block material already affords a high level of sealing integrity.

A further embodiment of a multi-part connector for simply connecting tubes or pipes to each other is shown in FIG. 5. The main bodies 2, 2a are of a substantially similar configuration to the main bodies described with reference to FIG. 4. The recesses 33 and 34 however are of sufficient depth to be able to accommodate the flanges of two tubes or pipes 6 and 7 to be connected to each other in the free space between the recesses 33 and 34. For that purpose the two main bodies 2, 2a each have a respective through bore 8a and embrace the tubes or pipes 6 and 7 so that the connecting surfaces 31 thereof are directly in sealing contact. The connecting surfaces 31 of the tubes or pipes 6 and 7 are pressed against each other by means of the main bodies 2, 2a by way of the flange rings 17 and 38 which are subjected to a force applied thereto so that this embodiment reliably guarantees a fluid-tight connection between the flanges of the tubes or pipes 6 and 7. The O-ring 41 provides a fluid-tight connection of the outer tube system, which is independent of the axial position of the main bodies.

The tube system according to the invention can eliminate components which are of metal or which comprise unwanted materials, within both the outer tube system and also the inner tube system. All fixing means are also accessible from the exterior.

It is also possible in accordance with the invention to provide one or more bores in the main body or bodies in order for example to introduce sensors which are pressure-sensitive or other sensors such as thermal or chemical sensors for monitoring the entire tube system, such sensors extending from the exterior into the through passages. Thus a possible rise or fall in pressure as a result of a leak in the inner tube system or the outer tube system, the escape of chemical substances and/or the thermal condition, can be immediately detected.

Furthermore, the embodiments described herein of various connectors, besides making tube or pipe connections, can also be used to make connections to hoses or measurement sensors of measurement apparatuses an well as to similar items of equipment such as fittings and the like.

It will be appreciated that the above-described embodiments of the invention have been set forth solely by way of example and illustration thereof and that various other modifications and alterations may be made therein without thereby departing from the spirit and scope of the invention.

What is claimed is:

1. A connector for connecting tubes, including:
    at least one block-shaped main body,
    at least one connecting surface on the main body for the connection of tubes, said tubes having a flange surface, the connecting surface comprising a flange face that contacts said flange surface on a connecting tube for pressing sealingly into said flange surface, and
    fixing means that presses the flange face on the main body against the flange surface of the connecting tube to obtain a fluid-tight connection of the connecting tube to the main body,
    in which the main body of the connector comprises cross-linked plastic material, and
    the connecting surface has at least one groove concentric with through bores in the connecting tube.

2. A connector as set forth in claim 1 wherein the main body consists of cross-linked plastic.

3. A connector as set forth in claim 1 wherein the cross-linked plastic material is selected from the group consisting of polyethylene and polyacetal.

4. A connector as set forth in claim 1 wherein the cross-linked plastic material is selected from the group consisting of phenolic resin (PF-resin) and unsaturated polyester resin.

5. A connector as set forth in claim 1 wherein the cross-linked plastic material is SMC.

6. A connector as set forth in claim 1 wherein the plastic material is a fiber-reinforced plastic material.

7. A connector as set forth in claim 1 wherein the main body is made from block material and is cross-linked by irradiation after shaping thereof.

8. A connector as set forth in claim 1 wherein the main body is substantially formed by injection molding and has been cross-linked by irradiation after shaping thereof.

9. A connector as set forth in claim 1 wherein the main body is substantially formed by injection molding and has been chemically cross-linked.

10. A connector as set forth in claim 1 wherein the main body has first and second sides, a connecting surface at each said side, and at least one first through bore which opens at both sides at the respective connecting surfaces.

11. A connector as set forth in claim 10 wherein the first through bore is of different diameters in the vicinity of respective connecting surfaces.

12. A connector as set forth in claim 10 and further including a bore with a female screwthread opening into the at least one first through bore.

13. A connector as set forth in claim 1, wherein the main body includes anchor means for anchoring the fixing means for securing the connection of the main body to the connecting tube.

14. A connector as set forth in claim 13, wherein the anchor means include tie bars and wherein the main body has second through bores accommodating in the second through bores respective tie bars, which are provided on opposite sides of the main body with respective fixing means which are accessible from the exterior.

15. A connector as set forth in claim 14 including means for securing the tie bars to prevent displacement in the axial direction within the main body.

16. A connector as set forth in claim 15 wherein said securing means include pins extending transversely through the tie bars.

17. A connector an set forth in claim 1 wherein the connecting surface includes a conical portion.

18. A connector as set forth in claim 1 including at least one further connecting surface wherein at least one of the connecting surfaces is arranged at an angle which is not a multiple of 90° relative to said at least one further connecting surface.

19. A connector as set forth in claim 1 wherein the connecting surface of the main body and the co-operating connecting surface of the tube are adapted to be joined together without the interposition of a sealing means.

20. A connector as set forth in claim 1, wherein the main body has an outer tube surrounding the connecting tube and at least one separate through passage which opens at a connecting surface outside the connecting surface of the connecting tube and within a connecting surface of the outer tube.

21. A connector as set forth in claim 1 including a bore in the main body that receives a sensing means for monitoring of the tube.

22. A connector as set forth in claim 1 comprising a further main body wherein the tubes extend entirely through respective first through bores of the main bodies such that the respective connecting surfaces of the tubes are directly in contact, wherein they are disposed between the connecting surface of the one main body and the connecting surface of the further main body.

23. A connector for connecting tubes, including:

at least one block-shaped main body, at least one connecting surface on the main body for the connection of tubes, said tubes having a flange surface, the connecting surface comprising a flange face that contacts said flange surface on a connecting tube, and fixing means that presses the flange face on the main body against the flange surface of the connecting tube to obtain a fluid-tight connection of the connecting tube to the main body, in which the main body of the connector comprises cross-linked plastic material, and the main body includes anchor means for anchoring the fixing means for securing the connection of the main body to the connecting tube.

24. A connector for connecting tubes, including:

at least one block-shaped main body, at least one connecting surface on the main body for the connection of tubes, said tubes having a flange surface, the connecting surface comprising a flange face that contacts said flange surface on a connecting tube for pressing sealingly into said flange surface, and fixing means that presses the flange face on the main body against the flange surface of the connecting tube to obtain a fluid-tight connection of the connecting tube to the main body, in which the main body of the connector comprises cross-linked plastic material, and the main body has an outer tube surrounding the connecting tube and at least one separate through passage, which opens at a connecting surface outside the connecting surface of the connecting tube within a connecting surface of the outer tube.

25. A connector as set forth in claim 24 including a further main body serving as an adaptor disposed between the connecting surface of the connecting tube and the connecting surface of the at least one main body.

26. A connector as set forth in claim 25 wherein the further main body comprises substantially the same material as the at least one main body.

27. A connector as set forth in claim 25 wherein at least one of the adaptor and the connecting surface of the at least one main body is such that the connecting surface of the first tube is arranged directly between a connecting surface of the adaptor and the connecting surface of the at least one main body, the adaptor having for each through passage of the at least one main body an associated through passage.

28. A connector as set forth in claim 25 wherein the further main body has a sealing means at its outer periphery to provide a hermetically closed system comprising the through passages and the cavity between the first tube and the outer tube.

29. A connector as set forth in claim 28 wherein the sealing means is an O-ring.

* * * * *